F. ENGELHARDT.
CLUTCH.
APPLICATION FILED JUNE 23, 1913.

1,125,278.

Patented Jan. 19, 1915.

Witnesses:
Julius H. Kraus
Madeline F. Hirsch

Inventor
Frederick Engelhardt
By his Attorneys

UNITED STATES PATENT OFFICE.

FREDERICK ENGELHARDT, OF ST. JOHNSVILLE, NEW YORK.

CLUTCH.

1,125,278.  Specification of Letters Patent.  Patented Jan. 19, 1915.

Application filed June 23, 1913. Serial No. 775,236.

*To all whom it may concern:*

Be it known that I, FREDERICK ENGELHARDT, a citizen of the United States, residing at St. Johnsville, county of Montgomery, and State of New York, have invented a new and Improved Clutch, of which the following is a specification.

This invention relates to a novel clutch adapted to transmit power from a rock shaft to a driven shaft, a pair of said clutches when actuating a pair of driven shafts being well adapted for driving alternately the shafts of the tune sheet receiving and delivering rollers, in an autopneumatic piano or similar musical instrument.

Figure 1:
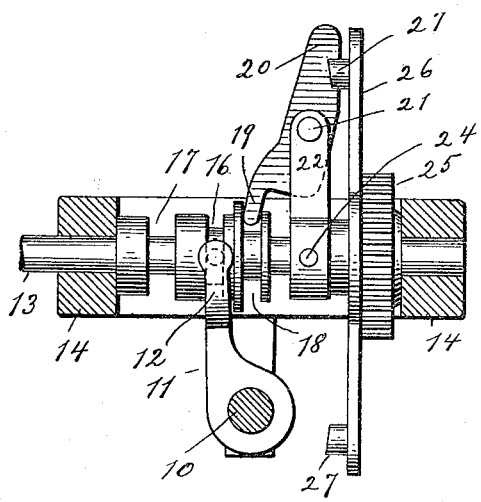
Figure 2:
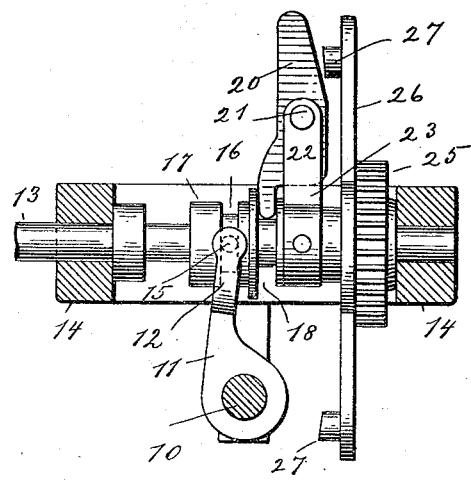
Figure 3:
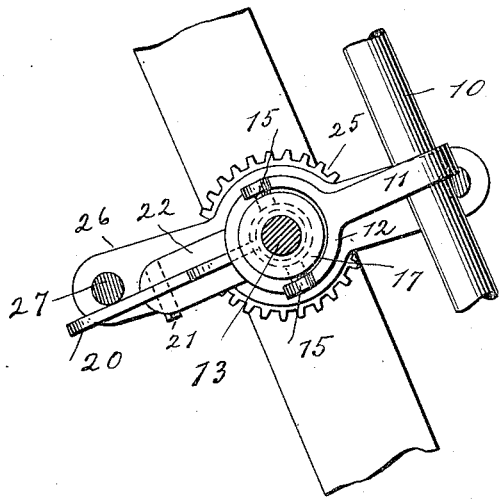

In the accompanying drawing: Figure 1 is a side view partly in section of a clutch embodying my invention, showing the same closed; Fig. 2 a similar view, showing the clutch open, and Fig. 3 a plan partly in section.

A rock shaft 10 journaled in suitable bearings is provided with a relatively fixed arm 11, terminating in a fork 12 that straddles a driven shaft 13, journaled in bearings 14 and adapted to actuate a music roller or similar device. Fork 12 has a pair of inwardly extending pins 15, that are received within a corresponding circumferential groove 16 of a sleeve 17 loosely mounted on shaft 13. Sleeve 17 is provided with an additional circumferential groove 18, which is engaged by the heel 19 of a tappet 20. The latter is fulcrumed at 21 to an arm 22, the eye 23 of which is firmly secured to shaft 13 by a pin 24 or otherwise. Upon shaft 13 is loosely mounted a driven pinion 25 which is provided with a relatively fixed cross piece 26, from which extend laterally a pair of studs or abutments 27. If shaft 10 is turned in one direction, it will by arm 11 and sleeve 17, swing tappet 20 into the path of studs 27, so as to close the clutch (Fig. 1) and cause shaft 13 to be rotated. When shaft 10 is turned in the other direction, tappet 20 will be withdrawn from studs 27, so that the clutch is opened (Fig. 2) and shaft 13 is arrested.

It will be seen that by the construction described an easy and absolutely reliable operation of the clutch is insured which adapts the same more especially for operating music sheet rollers, inasmuch as by the positive action of the clutch any accidental tearing off of the music sheets from their rollers is effectively prevented.

I claim:

1. A clutch comprising a shaft, an arm fast thereon, a tappet pivoted to the arm, a grooved sleeve loosely encompassing the shaft and engaged by the tappet, means for sliding the sleeve upon the shaft and thereby tilting the tappet, a driven wheel loosely mounted on the shaft, and an abutment on the wheel adapted to be engaged by the tappet.

2. A clutch comprising a shaft, an arm fast thereon, a tappet pivoted to the arm and having a heel, a sleeve loosely mounted on the shaft and having a groove that is engaged by the tappet-heel, a driven wheel loosely mounted on the shaft, an abutment on said wheel, and means for sliding the sleeve away from said wheel whereby the tappet is tilted into the path of the abutment.

FREDERICK ENGELHARDT.

Witnesses:
FRANK C. BALDWIN,
ALPHONSE HEINRICH.

Copies of this patent may be obtained for five cents each, by addressing the "Commissioner of Patents, Washington, D. C."